United States Patent
Kurata et al.

(10) Patent No.: US 11,413,958 B2
(45) Date of Patent: Aug. 16, 2022

(54) FUEL CUT-OFF UNIT ATTACHMENT STRUCTURE

(71) Applicant: HONDA MOTOR CO., LTD., Tokyo (JP)

(72) Inventors: Ko Kurata, Wako (JP); Hiroshi Inaoka, Wako (JP); Ikuo Hara, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/297,473

(22) PCT Filed: Nov. 30, 2018

(86) PCT No.: PCT/JP2018/044289
§ 371 (c)(1),
(2) Date: May 27, 2021

(87) PCT Pub. No.: WO2020/110311
PCT Pub. Date: Jun. 4, 2020

(65) Prior Publication Data
US 2022/0009344 A1    Jan. 13, 2022

(51) Int. Cl.
*B60K 15/035* (2006.01)
*B60K 15/03* (2006.01)

(52) U.S. Cl.
CPC ............ *B60K 15/03519* (2013.01); *B60K 2015/03289* (2013.01); *Y10T 137/3099* (2015.04)

(58) Field of Classification Search
CPC .... B60K 15/03519; B60K 2015/03289; Y10T 137/3099
See application file for complete search history.

(56) References Cited

U.S. PATENT DOCUMENTS

| 4,781,218 A | * | 11/1988 | Mori ................ B60K 15/03519 137/202 |
| 4,991,615 A | * | 2/1991 | Szlaga ............. B60K 15/03519 137/202 |

(Continued)

FOREIGN PATENT DOCUMENTS

| JP | 41-017482 | 10/1966 |
| JP | 04-052929 | 5/1992 |

(Continued)

OTHER PUBLICATIONS

International Preliminary Report on Patentability for International Application No. PCT/JP2018/044289 dated Nov. 12, 2019.

(Continued)

*Primary Examiner* — Patrick C Williams
(74) *Attorney, Agent, or Firm* — Amin, Turocy & Watson, LLP

(57) ABSTRACT

The present invention provides an attachment structure of a fuel cut-off unit (U) that is provided in a fuel tank (31) of a saddle-type vehicle (1), includes a breather passage (114) for discharging volatile fuel to the outside, and includes a valve device (50) for cutting off outflow of liquid fuel. The fuel cut-off unit (U) includes an accommodation container (100) constituted of a fitting portion (U2) which is inserted into the fuel tank (31) at the time of attachment to the fuel tank (31) and a unit exterior portion (U1) which is positioned outside the fuel tank (31). A first locking portion (105) for performing positioning at the time of attachment to the fuel tank (31) is formed in the fitting portion (U2). A penetration hole (C) penetrating from the inside to the outside such that the fitting portion (U2) is inserted therethrough is formed in the fuel tank (31). A second locking portion (F) for fixing the fuel cut-off unit (U) by causing the first locking portion (105) to (Continued)

be engaged from an inner side of the fuel tank is provided in a circumferential edge portion of the penetration hole (C).

8 Claims, 9 Drawing Sheets

(56) References Cited

U.S. PATENT DOCUMENTS

| | | | | |
|---|---|---|---|---|
| 5,083,583 | A * | 1/1992 | Benjey | B60K 15/03519 137/587 |
| 5,678,590 | A * | 10/1997 | Kasugai | B60K 15/03519 137/202 |
| 5,680,848 | A * | 10/1997 | Katoh | B60K 15/03519 123/516 |
| 5,901,733 | A | 5/1999 | Ohno et al. | |
| 5,954,082 | A * | 9/1999 | Waldorf | F16K 24/044 137/202 |
| 6,206,433 | B1 * | 3/2001 | Bloomer | F02M 35/10144 285/82 |
| 2002/0124909 | A1 * | 9/2002 | Groom | B60K 15/03519 141/192 |
| 2003/0094763 | A1 | 5/2003 | Benjey | |

FOREIGN PATENT DOCUMENTS

| | | |
|---|---|---|
| JP | 09-242636 | 9/1997 |
| JP | 2000-110976 | 4/2000 |
| JP | 2003-182390 | 7/2003 |
| JP | 2005-036984 | 2/2005 |
| JP | 2006-161740 | 6/2006 |
| JP | 2012-219726 | 11/2012 |
| JP | 2013-202164 | 10/2013 |

OTHER PUBLICATIONS

International Search Report and Written Opinion for International Application No. PCT/JP2018/044289 dated Feb. 26, 2019, 9 pages.

* cited by examiner

FUEL CUT-OFF UNIT ATTACHMENT STRUCTURE

TECHNICAL FIELD

The present invention relates to a fuel cut-off unit attachment structure.

BACKGROUND ART

A fuel tank of a saddle-type vehicle is provided with a valve device (roll-over valve) for allowing gasoline vapor filling the inside of the tank to escape and preventing fuel leakage when a vehicle body inclined at least a predetermined angle or falls over. In a step of attaching such a valve device to a fuel tank, reliably attaching the valve device while improving workability is required.

Patent Literature 1 (Japanese Unexamined Patent Application, First Publication No. 2006-161740) discloses a technology of attaching a float valve to a tank. According to this attachment method, a flange portion of a float valve attached to the inside of a fuel tank is disposed and fastened between a holder and a cover member, and the float valve is fixed to the fuel tank.

SUMMARY OF INVENTION

Technical Problem

However, according to the technology disclosed in Patent Literature 1, there is a problem in that the number of components used in a structure in which the float valve is fastened and attached to the fuel tank is large.

The present invention has been made in consideration of such circumstances, and an object thereof is to provide an attachment structure of a fuel cut-off unit in which the structure can be simplified and attachment can be performed simply and reliably.

Solution to Problem

Regarding a solution to the foregoing problem, the fuel cut-off unit attachment structure of the present invention have the following configurations.

(1) A fuel cut-off unit attachment structure is an attachment structure of a fuel cut-off unit (U) that is provided in a fuel tank (31) of a saddle-type vehicle (1), includes a breather passage (114) for discharging volatile fuel to the outside, and includes a valve device (50) for cutting off outflow of liquid fuel. The fuel cut-off unit (U) includes an accommodation container (100) constituted of a fitting portion (U2) which is inserted into the fuel tank at the time of attachment to the fuel tank (31) and a unit exterior portion (U1) which is positioned outside the fuel tank. A first locking portion (105) for performing positioning at the time of attachment to the fuel tank (31) is formed in the fitting portion (U2). A penetration hole (C) penetrating from the inside to the outside such that the fitting portion (U2) is inserted therethrough is formed in the fuel tank (31). A second locking portion (F) for fixing the fuel cut-off unit (U) by causing the first locking portion (105) to be engaged from an inner side of the fuel tank is provided in a circumferential edge portion (C2) of the penetration hole (C).

(2) In the fuel cut-off unit attachment structure according to the aspect (1), the accommodation container (100) may include a fixing pedestal (103) which is formed to have a larger diameter than the penetration hole (C), and a first elastic member (D) may be provided between the fixing pedestal (103) and the fuel tank (31).

(3) In the fuel cut-off unit attachment structure according to the aspect (1) or (2), the circumferential edge portion (C2) may be provided with a tubular inner wall portion (C1) which is formed to protrude in an inward direction of the fuel tank (31), and the second locking portion (F) may be formed in the inner wall portion (C1).

(4) In the fuel cut-off unit attachment structure according to the aspect (3), the first locking portion (105) may be formed to protrude from a surface of the accommodation container (100), the inner wall portion (C1) may be formed to have a diameter smaller than an outer diameter of the first locking portion (105) in a plan view, and the second locking portion (F) may be formed such that the first locking portion (105) is engaged therewith in the inner wall portion (C1).

(5) In the fuel cut-off unit attachment structure according to any one of aspects (1) to (4), a cutout portion (F1) may be formed in the second locking portion (F), and the cutout portion (F1) may be cut out to have a larger diameter than the first locking portion (105) in a radial direction of the penetration hole (C).

(6) In the fuel cut-off unit attachment structure according to the aspects (4), a circumferential wall portion (103E) may be formed in a circumferential direction on an outer circumferential surface of the accommodation container (100), and a second elastic member (W) may be provided between the circumferential wall portion (103E) and the inner wall portion (C1).

(7) In the fuel cut-off unit attachment structure according to the aspects (6), a stepped step portion (Q) may be formed in the penetration hole (C), a tubular vertical wall (Q1) which protrudes downward from an upper surface side of an outer wall of the fuel tank (31) and a toric horizontal wall (Q2) which protrudes toward an inner side of the penetration hole (C) in a horizontal direction from a lower end of the vertical wall may be formed in the step portion (Q), and the second elastic member (W) may be disposed between the vertical wall (Q1) and the horizontal wall (Q2).

(8) In the fuel cut-off unit attachment structure according to any one of aspects (1) to (7), three or more of the first locking portions (105) may be formed in the circumferential direction.

(9) In the fuel cut-off unit attachment structure according to any one of aspects (1) to (8), the combustion cut-off unit (U) may be disposed at an apex portion of the fuel tank (31).

Advantageous Effects of Invention

According to the aspect (1), since the fuel cut-off unit is fixed to the fuel tank due to cooperation between the first locking portion and the second locking portion, positioning of the fuel cut-off unit with respect to the fuel tank can be reliably performed while the number of man-hours required for assembly is reduced.

According to the aspect (2), positioning of the fuel cut-off unit in a vertical direction can be performed while sealing is performed using the first elastic member.

According to the aspect (3), since the tubular inner wall portion having the second locking portion formed therein is formed to protrude inside the fuel tank, an attachment position of the fuel tank with respect to the fuel cut-off unit can be lowered, and an external protruding amount of the fuel cut-off unit can be reduced.

According to the aspect (4), the first locking portion can abut the second locking portion in an upward direction, positioning of the fuel cut-off unit with respect to the fuel tank in the vertical direction can be performed, and the fuel cut-off unit can be reliably fixed.

According to the aspect (5), the fuel cut-off unit can be fitted to the fuel tank in the upward direction.

According to the aspect (6), positioning of the fuel cut-off unit in the horizontal direction with respect to the penetration hole can be reliably performed, and airtightness between the fuel cut-off unit and the fuel tank can be reliably ensured.

According to the aspect (7), positioning of the second elastic member in the vertical direction and the circumferential direction with respect to the penetration hole can be performed simply and reliably.

According to the aspect (8), the fuel cut-off unit can be reliably fixed to the fuel tank.

According to the aspect (9), volatile fuel inside the fuel tank can be efficiently discharged to the outside.

DESCRIPTION OF EMBODIMENT

Hereinafter, an embodiment of the present invention will be described with reference to the drawings. Unless otherwise specified in the following description, directions to the front, the rear, the left, the right, and the like are the same as directions in a vehicle, which will be described below. An arrow FR indicating a side in front of the vehicle and an arrow UP indicating a side above the vehicle are marked in suitable places in the diagrams used in the following description.

<Entirety of Vehicle>

Figure 1:
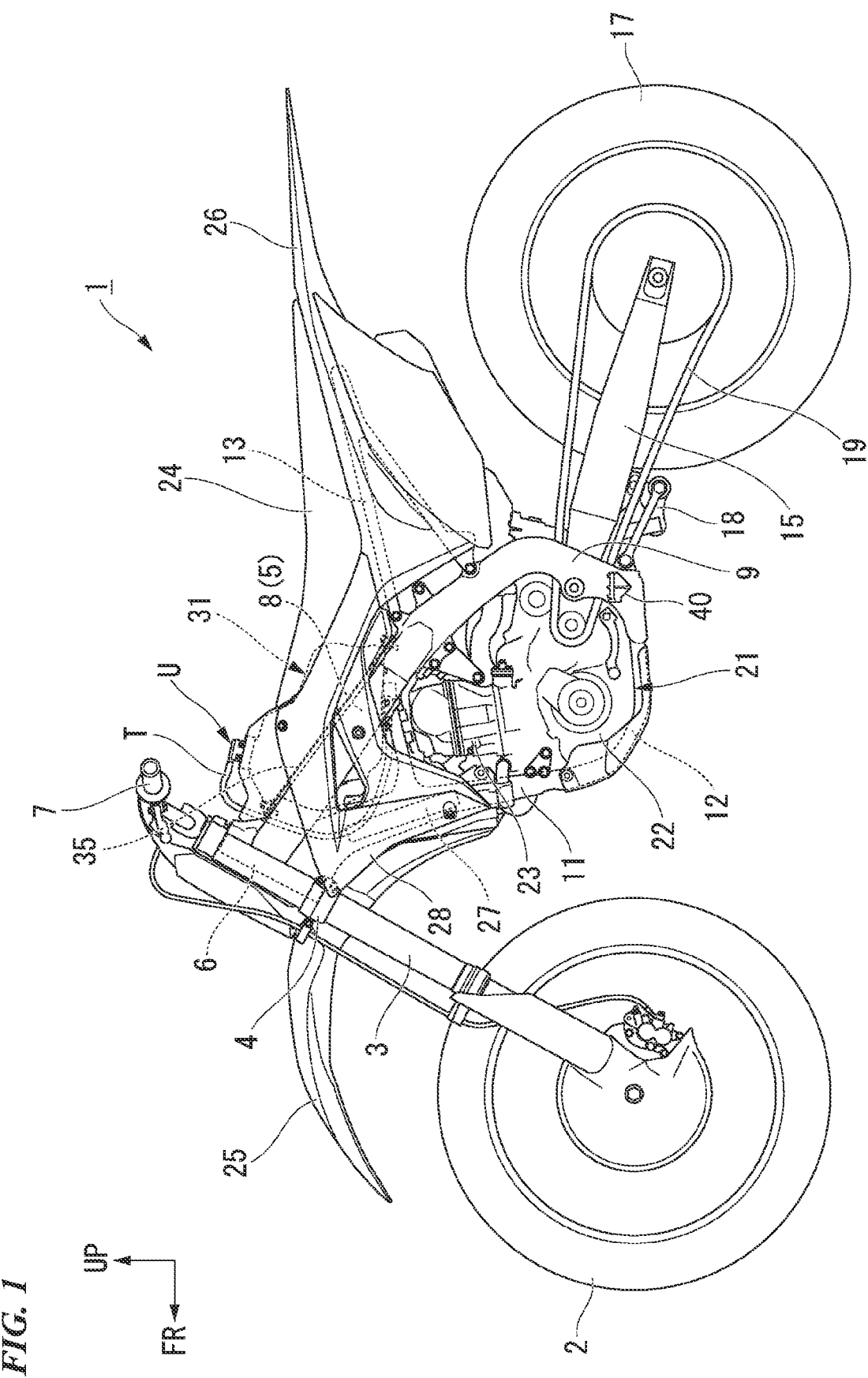
FIG. 1 is a left side view of a motorcycle according to an embodiment.
Figure 2:
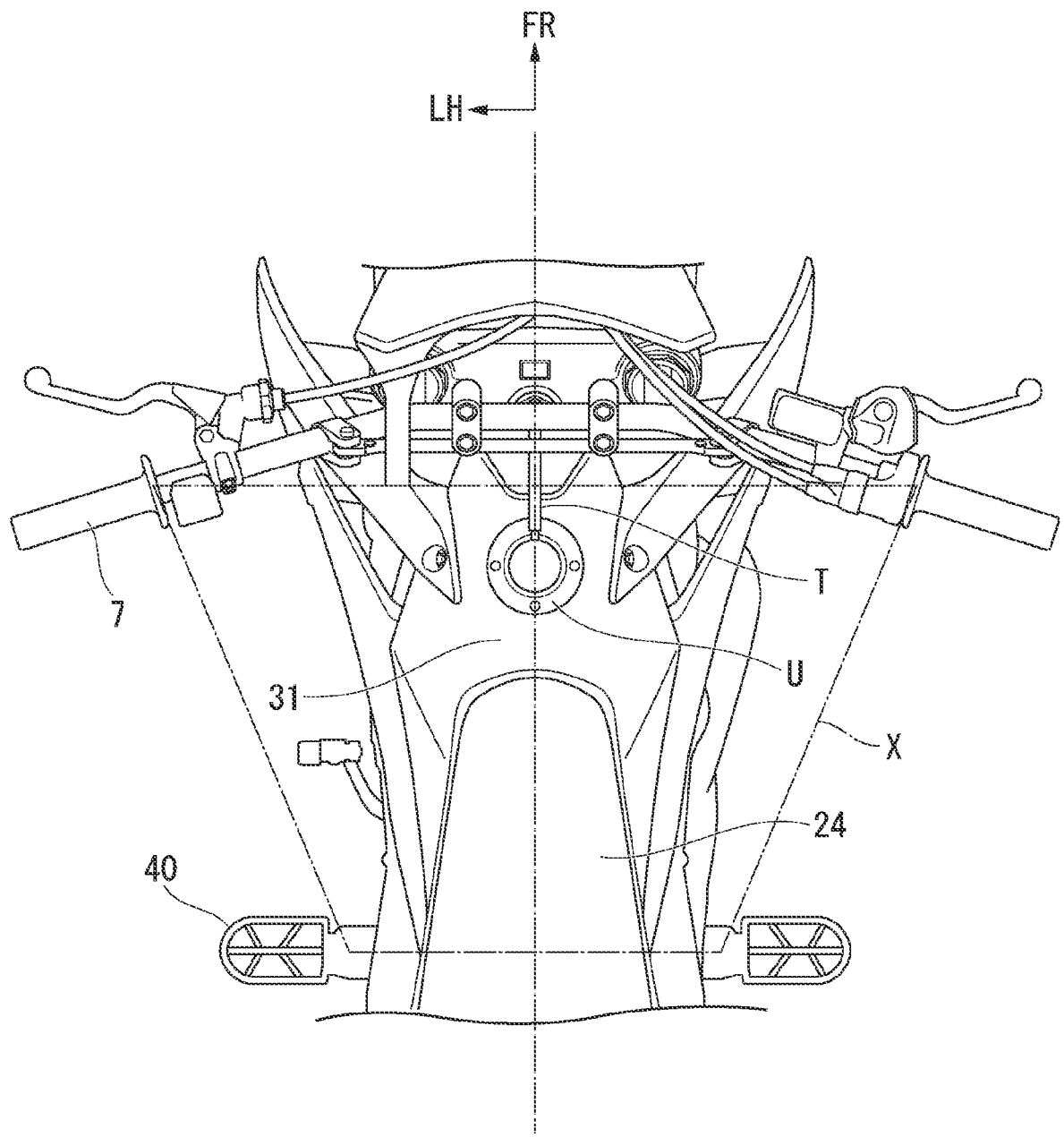
FIG. 2 is a plan view of the motorcycle.

FIGS. 1 and 2 show an off-road-type motorcycle 1 as an example of a saddle-type vehicle. A front wheel 2 of the motorcycle 1 is pivotally supported by lower end portions of left and right front forks 3. Upper portions of the left and right front forks 3 are supported by a head pipe 6 of a vehicle body frame 5 via a steering stem 4 in a steerable manner. A bar-type handlebar 7 is attached to an upper portion of the steering stem 4.

The vehicle body frame 5 includes the head pipe 6, a pair of left and right main tubes 8, a pair of left and right pivot frames 9, a single down frame 11, a pair of left and right lower frames 12, and a seat frame 13.

In a side view, the head pipe 6 is inclined and extends to be positioned further upward toward the rear side. The left and right main tubes 8 extend downward toward the rear from a rear upper portion of the head pipe 6. Rear end portions of the left and right main tubes 8 lead to upper end portions of the left and right pivot frames 9 in an intermediate portion of a vehicle body in a forward-rearward direction. The single down frame 11 extends obliquely downward to the rear from a rear lower portion of the head pipe 6 with a steeper inclination than the left and right main tubes 8.

The left and right lower frames 12 branch to the left and the right from a lower end portion of the down frame 11 and extend obliquely downward to the rear. Lower portions of the left and right lower frames 12 are curved to the rear. Rear portions of the left and right lower frames 12 are connected to lower end portions of the left and right pivot frames 9. The seat frame 13 is connected to rear portions of the left and right main tubes 8.

The vehicle body frame 5 constitutes a twin-spar-type cradle frame. An engine 21 that is a motor of the motorcycle 1 is mounted in an inner side portion of the vehicle body frame 5. The term "intermediate" used in the present embodiment means not only the center between both ends of a target but also a range on the inner side between both ends of the target.

A front end portion (base end portion) of a swing arm 15 is supported by lower portions of the left and right pivot frames 9 in a vertically swingable manner. A rear wheel 17 of the motorcycle 1 is pivotally supported by a rear end portion of the swing arm 15. A lower end portion of a rear cushion (not shown) is coupled to a front lower portion of the swing arm 15 via a link mechanism 18. An upper end portion of the rear cushion is coupled to a cross-member (not shown) lying between areas in a vicinity of the rear end portions of the left and right main tubes 8.

The engine 21 is a single-cylinder engine having a crankshaft parallel to a vehicle width direction (lateral direction). A lower portion of the engine 21 constitutes a crankcase 22. A cylinder 23 stands substantially in a perpendicular manner in a front upper portion of the crankcase 22.

A throttle body (not shown) of an engine intake system is connected to a rear portion of the cylinder 23. An exhaust pipe (not shown) of an engine exhaust system is connected to a front portion of the cylinder 23. A rear portion of the crankcase 22 also serves as a transmission case accommodating a clutch and a transmission. An output shaft of the transmission protrudes in a left side portion of the rear portion of the crankcase 22. The output shaft and the rear wheel 17 are coupled to each other via a chain-type power train mechanism 19.

A fuel tank 31 is provided above the cylinder 23 and between the left and right main tubes 8. The fuel tank 31 is disposed behind the head pipe 6. The fuel tank 31 is inclined downward to the front from an apex portion and is formed to be gently inclined downward toward the rear. A seat 24 is provided behind the left and right main tubes 8 and above the seat frame 13. The seat 24 extends in the forward-rearward direction. A front portion of the seat 24 is supported by a rear upper surface of the fuel tank 31.

Reference sign 25 in the diagrams indicates a front fender which is supported by a bottom bridge of the steering stem 4. Reference sign 26 indicates a rear fender which extends to the rear of the seat 24. Reference sign 27 indicates a pair of left and right radiators which are disposed on both sides of the down frame 11. And reference sign 28 indicates a pair of left and right shrouds which cover a range from a side surface of the fuel tank 31 to the front on side surfaces of the left and right radiators 27, respectively.

<Fuel Cut-Off Unit>

The motorcycle 1 described above includes a fuel cut-off unit U. The fuel cut-off unit U includes a valve device 50 for discharging volatile fuel inside the fuel tank 31 to the outside and cutting off outflow of liquid fuel.

Figure 3:
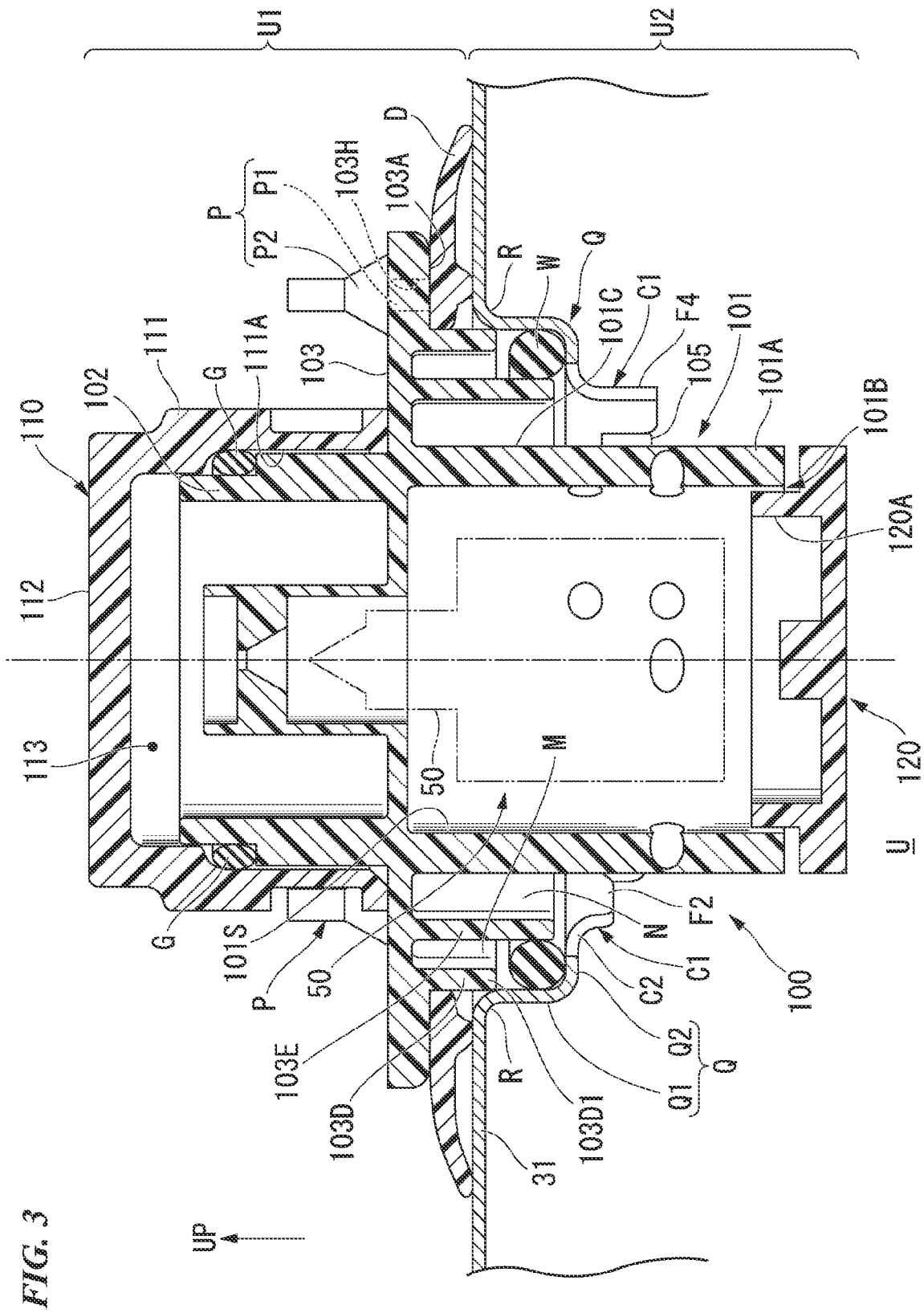
FIG. 3 is a cross-sectional view showing an attachment structure of a fuel cut-off unit.
Figure 4:
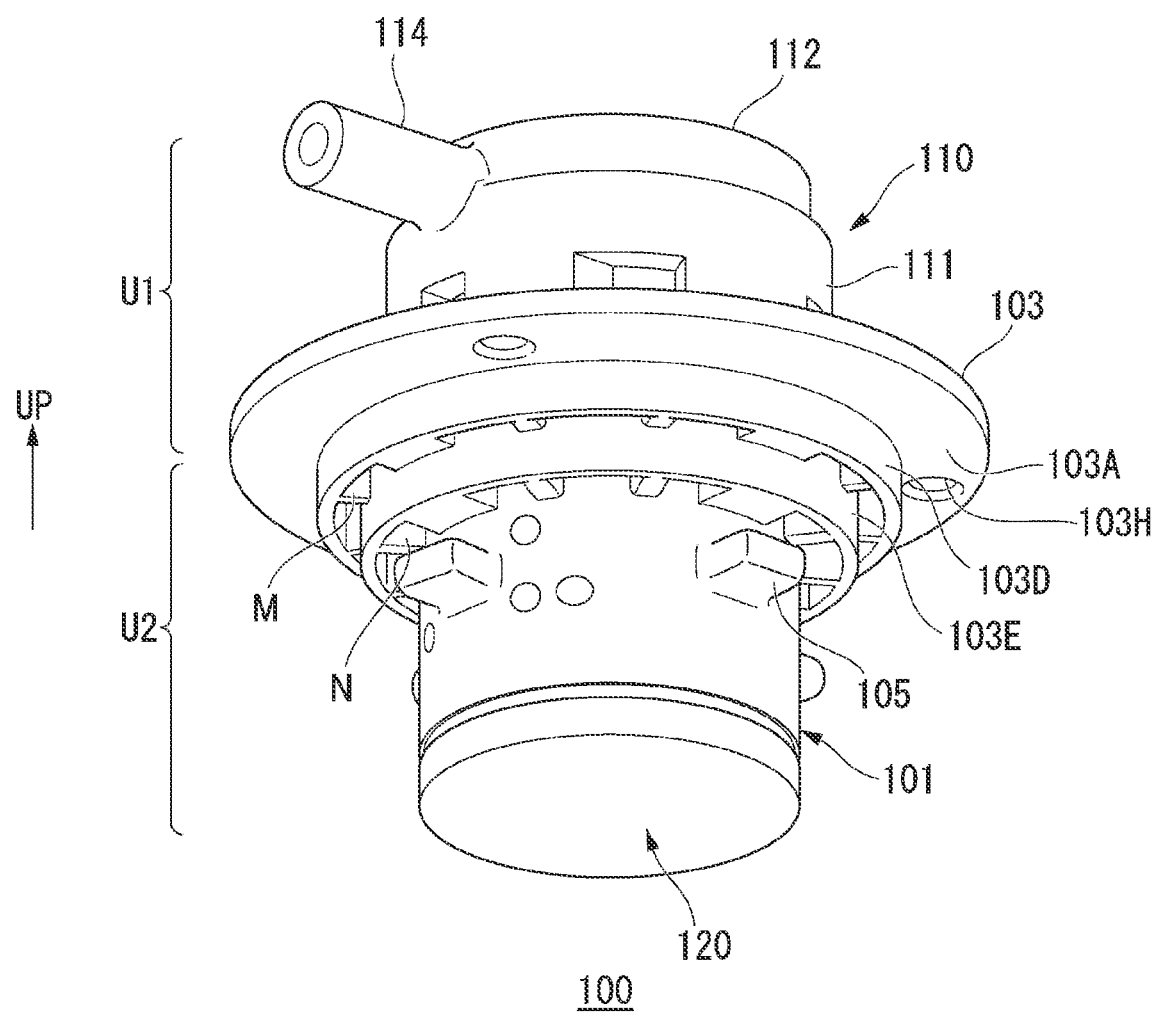
FIG. 4 is a perspective view of the fuel cut-off unit viewed in a lower surface direction.
Figure 5:
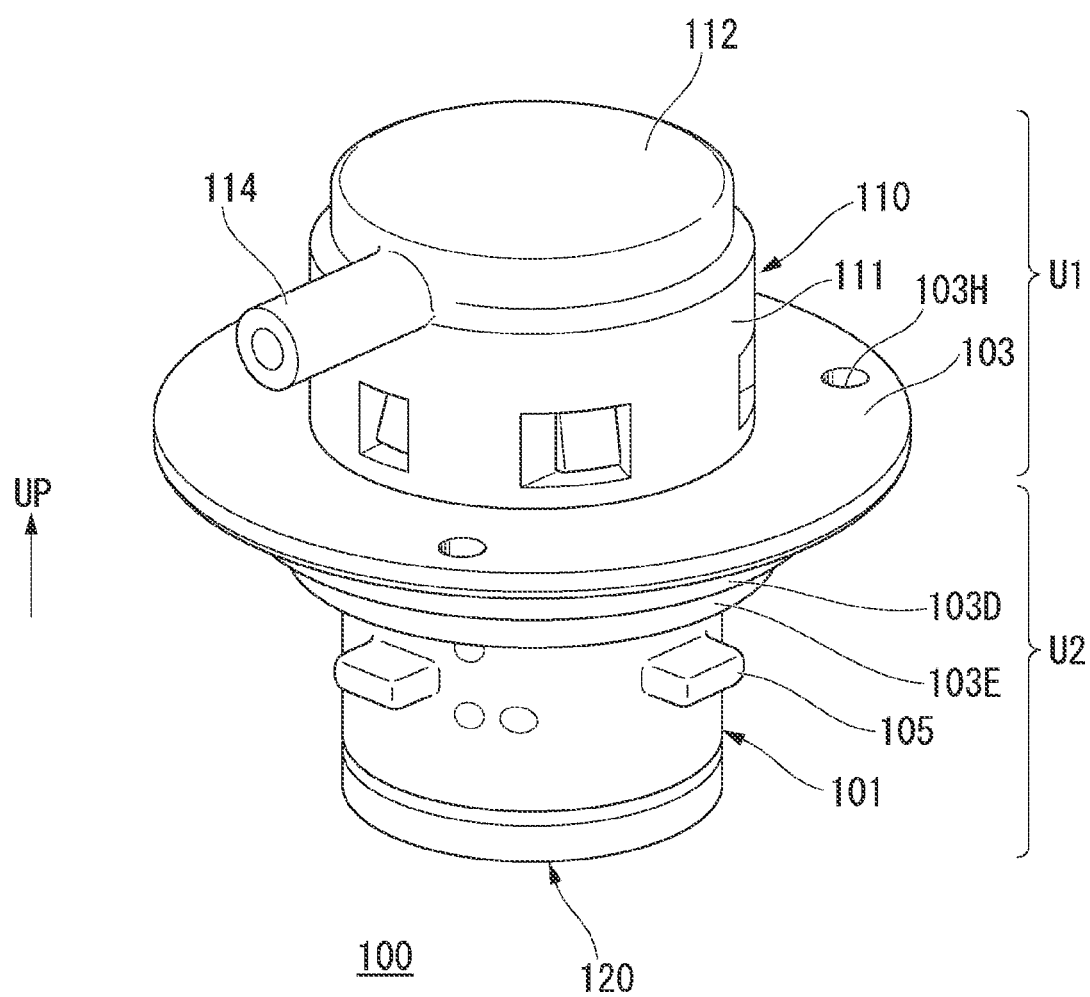
FIG. 5 is a perspective view of the fuel cut-off unit viewed in an upper surface direction.

As shown in FIGS. 3 to 5, the fuel cut-off unit U is attached to the fuel tank 31. The valve device 50 is a device including a valve mechanism which operates to prevent volatile fuel filling the inside thereof from being released to the atmosphere and to prevent fuel leakage when the vehicle body inclined at least a predetermined angle or falls over. For example, the valve mechanism includes a float valve 51, and the float valve 51 vertically moves in accordance with a liquid level of fuel. For example, the applicant has proposed a valve device for preventing fuel leakage in Japanese Unexamined Patent Application, First Publication No. 2006-46136 or the like. Since the valve device 50 of the present embodiment is constituted in a manner similar to a known roll-over valve, detailed description thereof will be omitted herein.

An attachment structure of the fuel cut-off unit U fixes an accommodation container 100 accommodating the valve device 50 to the fuel tank 31. In the fuel cut-off unit U, a unit exterior portion U1 is a region which is exposed to the outside of the fuel tank 31, and a fitting portion U2 is a region which is inserted into the fuel tank 31 and is fitted to the fuel tank 31.

In the fuel cut-off unit U, the accommodation container 100 is a container accommodating the pillar-shaped valve device 50. The accommodation container 100 includes a cylindrical main body portion 101 in which an accommodation space 100S accommodating the valve device 50 is formed, a lid portion 110 which blocks an opening of an upper portion of the main body portion 101, and a bottom portion 120 which blocks an opening of a lower portion of the main body portion 101. The fuel cut-off unit U is disposed in a penetration hole C which is provided in the apex portion of the fuel tank 31. Accordingly, volatile fuel inside the fuel tank 31 can be efficiently discharged to the outside.

For example, the lid portion 110 includes a cylindrical side wall portion 111 and a disk-shaped top plate portion 112 which blocks an opening of an upper portion of the side wall portion 111. The upper portion of the side wall portion 111 is provided with a pillar-shaped pipe attachment portion 114 which protrudes outward in a horizontal direction from a part on an outer circumferential surface. For example, one end of a rubber pipe T (refer to FIGS. 1 and 2) is connected to the pipe attachment portion 114. The pipe attachment portion 114 is provided at a position where the influence of vertical movement of fuel inside the fuel tank 31 is least likely to be received at the time of sudden acceleration or deceleration of the vehicle.

For example, the other end of the rubber pipe T is connected to a charcoal canister (not shown; which will hereinafter be shortened to a canister). The rubber pipe T introduces mixed gas (volatile fuel) of volatile gasoline and air inside the tank to the canister. That is, in the fuel cut-off unit U, the pipe attachment portion 114 serves as a part of a breather passage for discharging volatile fuel inside the fuel tank 31 to the outside. Volatile fuel is introduced to the canister, and then the volatile fuel returns to an intake passage in a vicinity of a combustion chamber of the engine 21 and is combusted in the combustion chamber.

An upper portion 102 of the main body portion 101 is inserted into an internal space 113 of the lid portion 110 from below the lid portion 110 and is fitted to the lid portion 110. An elastic member such as an O-ring G which is elastically deformed is fitted to an outer circumference of the upper portion 102 of the main body portion 101 in a circumferential direction. In a state in which the upper portion 102 of the main body portion 101 is fitted into the internal space 113 of the lid portion 110, the O-ring G is sandwiched between an outer circumferential surface of the upper portion 102 of the main body portion 101 and an inner wall surface 111A of the lid portion 110, is squashed in a cross-sectional direction, and closely adheres to the main body portion 101 and the lid portion 110.

The bottom portion 120 is fitted to a lower end 101A of the main body portion 101 such that a circular opening 101B is blocked. A circular protruding portion 120A protruding upward to be engaged with an inner diameter of the opening 101B is formed on an upper surface of the bottom portion 120. After the valve device 50 is inserted into an internal space 1015 of the main body portion 101, the lid portion 110 and the bottom portion 120 are fitted to the main body portion 101, and the fuel cut-off unit U is thereby assembled.

A fixing pedestal 103 for attachment to the fuel tank 31 is formed along an outer circumferential surface 101C of the main body portion 101. For example, in the main body portion 101, the fixing pedestal 103 is formed substantially at the same position as a lower end of the lid portion 110 in a side view. For example, the fixing pedestal 103 is formed to have a toric shape in a plan view. The fixing pedestal 103 has a larger diameter than the penetration hole C formed in the fuel tank 31 and is formed to protrude horizontally outward in a radial direction of the main body portion 101. In the fixing pedestal 103, a plurality of penetration holes 103H are formed in the circumferential direction.

A cylindrical first skirt 103D which hangs down concentrically with the main body portion 101 and a cylindrical second skirt 103E (circumferential wall portion) hanging down in a similar manner are formed on a lower surface 103A side of the fixing pedestal 103.

The fixing pedestal 103, the first skirt 103D, and the second skirt 103E are formed in consideration of a mold layout at the time of injection molding of the main body portion 101 and thinning of the main body portion 101. They may be formed to have a stepped shape in the main body portion 101 without being thinned or may be provided as a constitution of being separated from the main body portion 101.

The first skirt 103D is formed in the circumferential direction of the outer circumferential surface of the main body portion 101. A lower end portion 103D1 of the first skirt 103D abuts an edge R of an opening portion of the penetration hole C at the time of attachment and guides the accommodation container 100 to a predetermined position of the penetration hole C such that the center of the accommodation container 100 is at a position concentric with the center of the penetration hole C in a plan view.

Moreover, the second skirt 103E is formed on an inner side of the first skirt 103D. The second skirt 103E is formed to have a smaller inner diameter than the first skirt 103D and to have a larger outer diameter than the main body portion 101. The second skirt 103E is formed concentrically with the main body portion 101.

For example, the second skirt 103E is formed to have a larger protruding amount of downward protrusion than the first skirt 103D. In cooperation with a step portion Q formed in the penetration hole C at the time of attachment as described below, the second skirt 103E sandwiches an O-ring W (second elastic member) fitted to the step portion Q.

A plurality of reinforcement ribs N for mounting the second skirt 103E and the main body portion 101 are formed between the second skirt 103E and the main body portion 101. In a plan view, thicknesses of the reinforcement ribs N are not necessarily the same as each other. The plurality of reinforcement ribs N are formed to protrude radially outward from the main body portion 101.

A plurality of reinforcement ribs M for mounting the second skirt 103E and the first skirt 103D are formed between the second skirt 103E and the first skirt 103D. In a plan view, thicknesses of the reinforcement ribs M are not necessarily the same as each other. The plurality of reinforcement ribs M are formed to protrude radially outward from the second skirt 103E. Since the plurality of reinforcement ribs N and M are formed, the main body portion 101 is reduced in weight, and the strength against a bending moment of the fixing pedestal 103 with respect to the main body portion 101 is improved.

A toric dust seal D (first elastic member) which is elastically deformable is attached to the lower surface 103A side of the fixing pedestal 103. A plurality of pins P for performing positioning at positions corresponding to the plurality of penetration holes 103H of the fixing pedestal 103 are formed in the dust seal D. The pins P are formed in the circumferential direction of the fixing pedestal 103 to protrude upward from an upper surface of the dust seal D.

The pins P are formed such that pillars P1 having substantially the same diameters as those of the penetration holes 103H protrude upward. Distal end portions P2 of the pins P are formed to have bottom portions having diameters larger than the diameters of the pillars and to have tapered shapes decreasing in diameter toward distal ends.

A portion below the lower surface 103A of the fixing pedestal 103 is the fitting portion U2. The fitting portion U2 is a region which is inserted into the fuel tank 31 and a fixed to the fuel tank 31 when the fuel cut-off unit U is attached to the fuel tank 31. The fitting portion U2 faces the inside of the tank and is exposed to vaporized fuel or fuel inside the fuel tank 31. Below the fixing pedestal 103, a plurality of claw portions 105 (first locking portions) are formed to protrude from the outer circumferential surface 101C of the main body portion 101.

For example, three or more claw portions 105 may be formed. In the present embodiment, four or more claw portions 105 are formed. As long as the main body portion 101 is stably fixed to the fuel tank 31, the number of claw portions 105 does not necessarily have to be four.

The plurality of claw portions 105 are formed to protrude radially outward in the radial direction of the main body portion 101 from a center axis of the main body portion 101 in a vertical direction in a plan view. The plurality of claw portions 105 do not necessarily have to be radially formed at equal intervals in the circumferential direction of the main body portion 101 in order to prevent an attachment error in a rotation direction.

For example, the claw portions 105 are formed to have flat plate protrusion shapes in a side view. In the claw portions 105, corner parts at which surfaces thereof intersect each other are chamfered, and the surfaces are formed to be gently connected to each other. As long as the claw portions 105 can be locked into the fuel tank 31 as described below, they may be formed to have other protrusion shapes such as pillar shapes.

Figure 6:
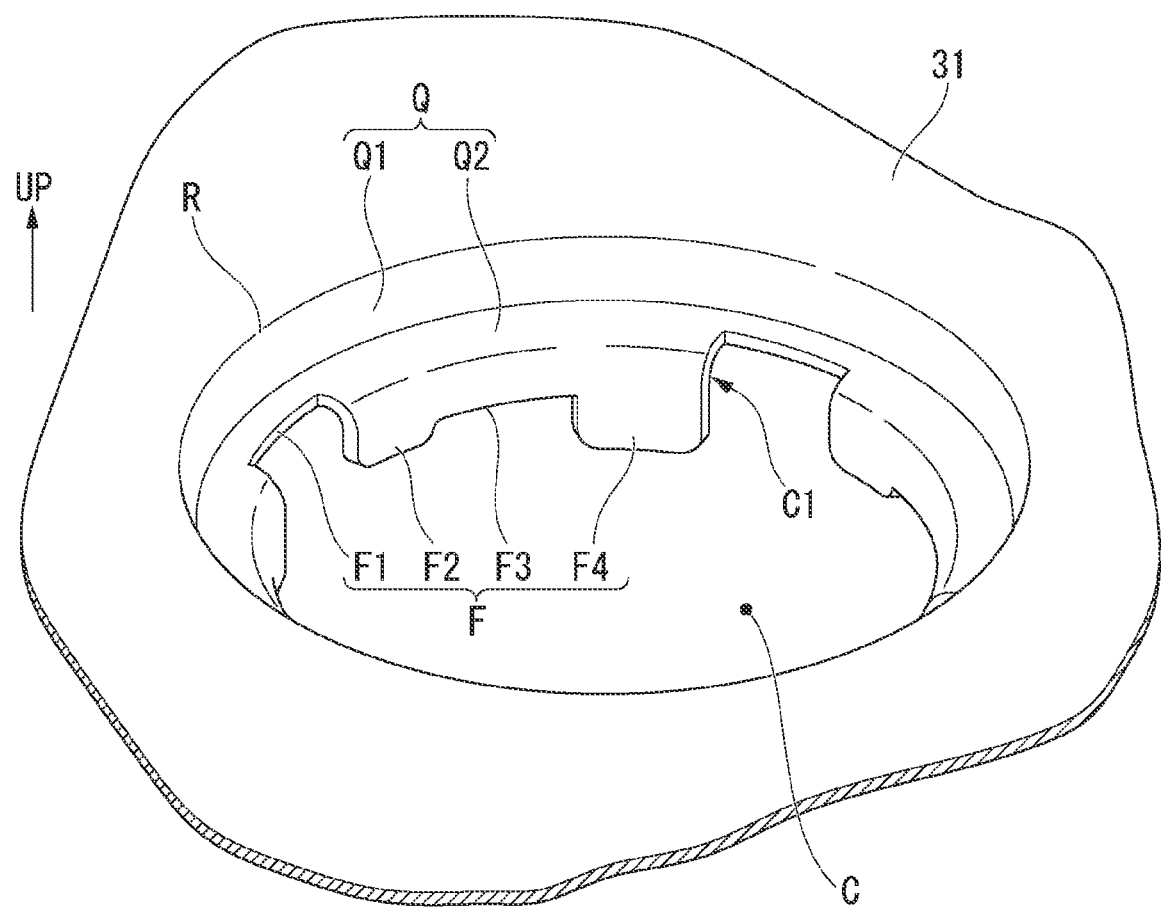
FIG. 6 is a perspective view showing a constitution of a penetration hole of a fuel tank.

As shown in FIG. 6, the circular penetration hole C is formed in the fuel tank 31 such that the fitting portion U2 of the fuel cut-off unit U is inserted thereinto. A shape for locking the fitting portion U2 is formed in a circumferential edge portion C2 of the penetration hole C. After the circular hole is formed in the fuel tank 31, the penetration hole C in which an end portion is formed by press working, cutting, or the like is formed. For example, the step portion Q recessed in an inward direction of the fuel tank 31 is formed in the circumferential edge portion C2 surrounding an opening of the penetration hole C.

The step portion Q is formed to have a shape recessed one step in a stepped shape from an outer wall of the fuel tank 31 on the upper surface side. The step portion Q includes a tubular vertical wall Q1 which protrudes downward from the outer wall of the fuel tank 31 on the upper surface side, and a toric horizontal wall Q2 which protrudes in the horizontal direction from a lower end of the vertical wall Q1 toward the penetration hole C in a center direction.

That is, the step portion Q is formed to be recessed downward from the edge R of the circular opening having the outer wall of the fuel tank 31 on the upper surface side as a reference surface. The O-ring W is fitted to the step portion Q.

A tubular inner wall portion C1 protruding in the inward direction of (downward to) the fuel tank 31 is formed in the circumferential edge portion around the penetration hole C. The inner wall portion C1 extends in the circumferential direction of the penetration hole C.

The inner wall portion C1 is formed to have a diameter smaller than the outer diameters of the plurality of claw portions 105 in a plan view. A plurality of locking portions F (second locking portions) which are engaged with the plurality of claw portions 105 and lock the fuel cut-off unit U are formed in the inner wall portion C1.

The locking portions F fix the fuel cut-off unit U (accommodation container 100) to the fuel tank 31 in cooperation with the claw portions 105. For example, each locking portion F includes a cutout portion F1 which is formed by cutting out the inner wall portion C1, a first stopper F2 which is adjacent to the cutout portion F1, a locking surface F3 which is adjacent to the first stopper F2, and a second stopper F4 which is adjacent to the locking surface F3.

For example, in a plan view of the penetration hole C, the cutout portions F1 are formed such that the inner wall portion C1 is cut out to have shapes slightly larger than those of the claw portion 105 at positions corresponding to a disposition relationship between the plurality of claw portions 105 in the inner wall portion C1.

The cutout portions F1 are formed by cutting out parts of the inner wall portion C1 such that they are on an outer side in the radial direction from outermost ends of the claw portions 105 in a plan view. The cutout portions F1 allow the claw portions 105 to slip into the lower end of the inner wall portion C1 when the fitting portion U2 of the accommodation container 100 is inserted into the fuel tank 31.

In the inner wall portion C1, the first stoppers F2 protruding downward from the lower end of the inner wall portion C1 are formed at positions adjacent to the cutout portions F1 in a clockwise direction in a plan view. Corner portions of the first stoppers F2 in the circumferential direction of the inner wall portion C1 are chamfered, and the corner portions are gently formed. The locking surfaces F3 for locking the claw portions 105 are formed at adjacent positions in the clockwise direction in the inner wall portion C1.

The locking surfaces F3 are formed to coincide with the shapes of the upper surfaces of the claw portions 105 such that the upper surfaces of the claw portions 105 abut the lower ends thereof. The locking surfaces F3 are formed such that the positions of the lower ends are above the lower ends of the first stoppers F2. The second stoppers F4 having a larger downward protruding amount than the first stoppers F2 are formed at positions adjacent to the locking surfaces F3 in the clockwise direction in a plan view.

<Attaching Step>

Next, a step of attaching the fuel cut-off unit U to the fuel tank 31 will be described.

Figure 7:
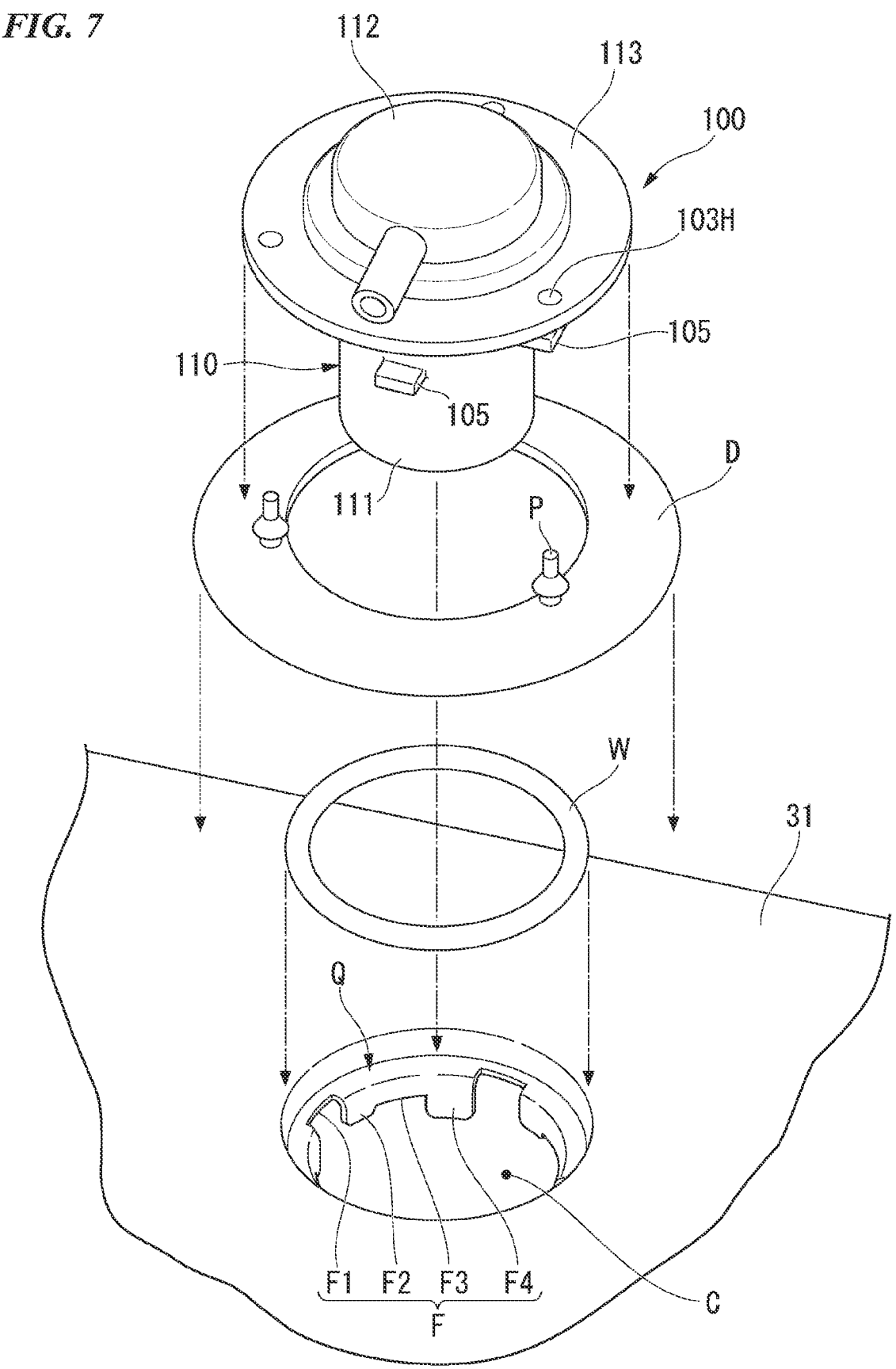
FIG. 7 is an exploded perspective view of the attachment structure of the fuel cut-off unit.

As shown in FIG. 7, the O-ring W is fitted along the corner portion between the vertical wall Q1 and the horizontal wall Q2 of the step portion Q of the penetration hole C. The toric dust seal D is attached to the lower surface 103A of the fixing pedestal 103 of the fuel cut-off unit U. At this time, the plurality of pins P formed in the dust seal D are fitted into the plurality of penetration holes 103H formed in the fixing pedestal 103, and the dust seal D is subjected to positioning (refer to FIG. 3).

When the dust seal D is attached to the fixing pedestal 103, the distal end portions P2 are inserted into the penetration holes 103H in a lower surface direction of the fixing pedestal 103. At this time, since distal ends of the distal end portions P2 are formed to have smaller diameters than the penetration holes 103H, they are easily inserted to the middle of the penetration holes 103H. Since the lower portions of the distal end portions P2 are formed to have larger diameters than the penetration holes 103H, they abut the penetration holes 103H in the middle of insertion. In this state, if a force of pressurizing the pins P upward is applied to the pins P from below at positions corresponding to the positions of the pins P on a lower surface of the dust seal D, the distal end portions are elastically deformed along tapered surfaces of the distal end portions P2 and are inserted into the penetration holes 103H while their diameters are reduced.

If the pins P are further pushed up from the lower portion of the dust seal D, the distal end portions P2 penetrate the penetration holes 103H and protrude to the upper surface of the fixing pedestal 103. At this time, the distal end portions P2 which have been compressed and elastically deformed by the penetration holes 103H return to the original state, and the diameter of the lower portion becomes larger than the diameters of the penetration holes 103H. Accordingly, the pins P are prevented from falling off the penetration holes 103H, and thus the dust seal D is reliably fixed at a predetermined position in the fixing pedestal 103.

Figure 8:
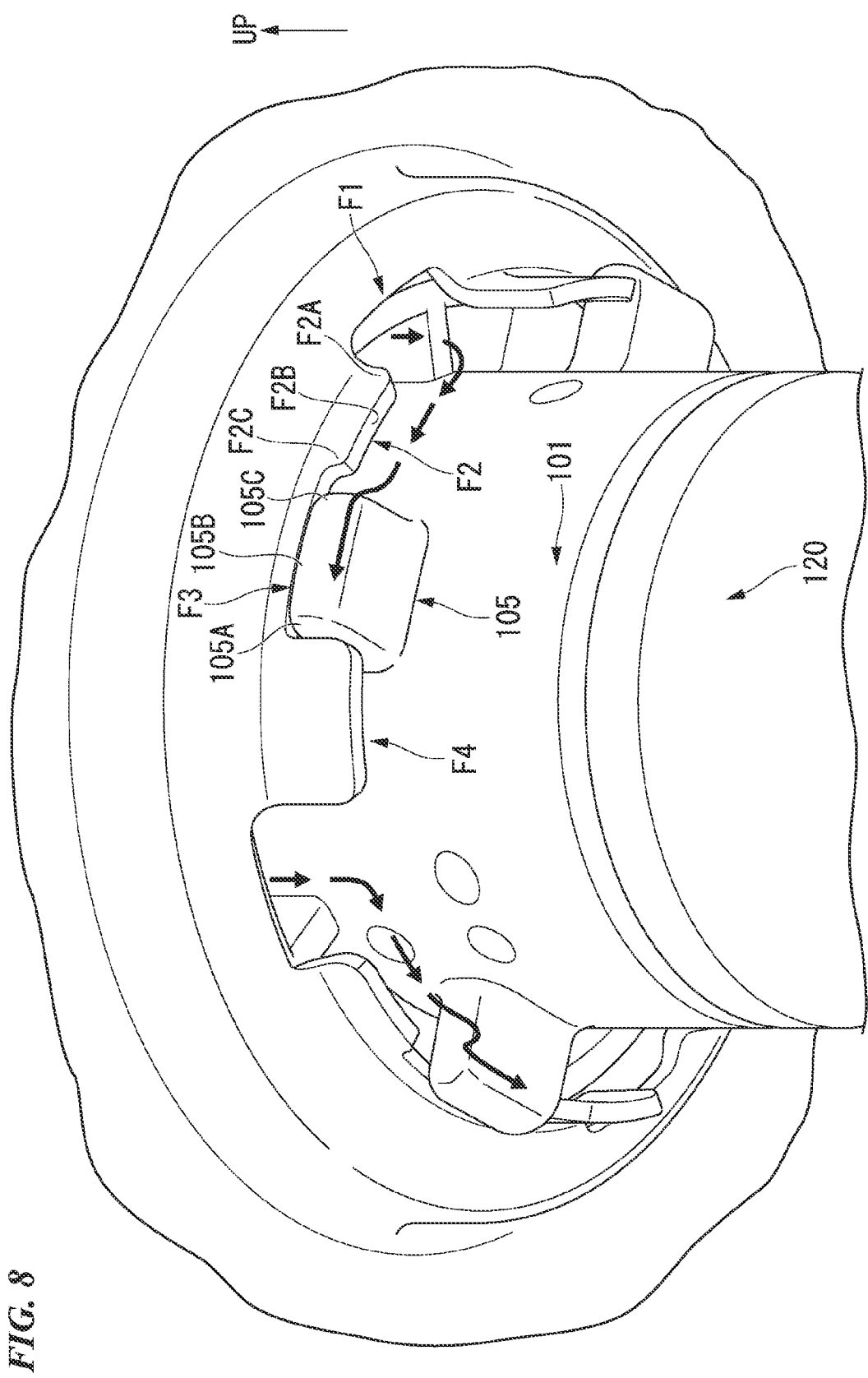
FIG. 8 is a perspective view showing a state in which claw portions are engaged with locking portions.
Figure 9:
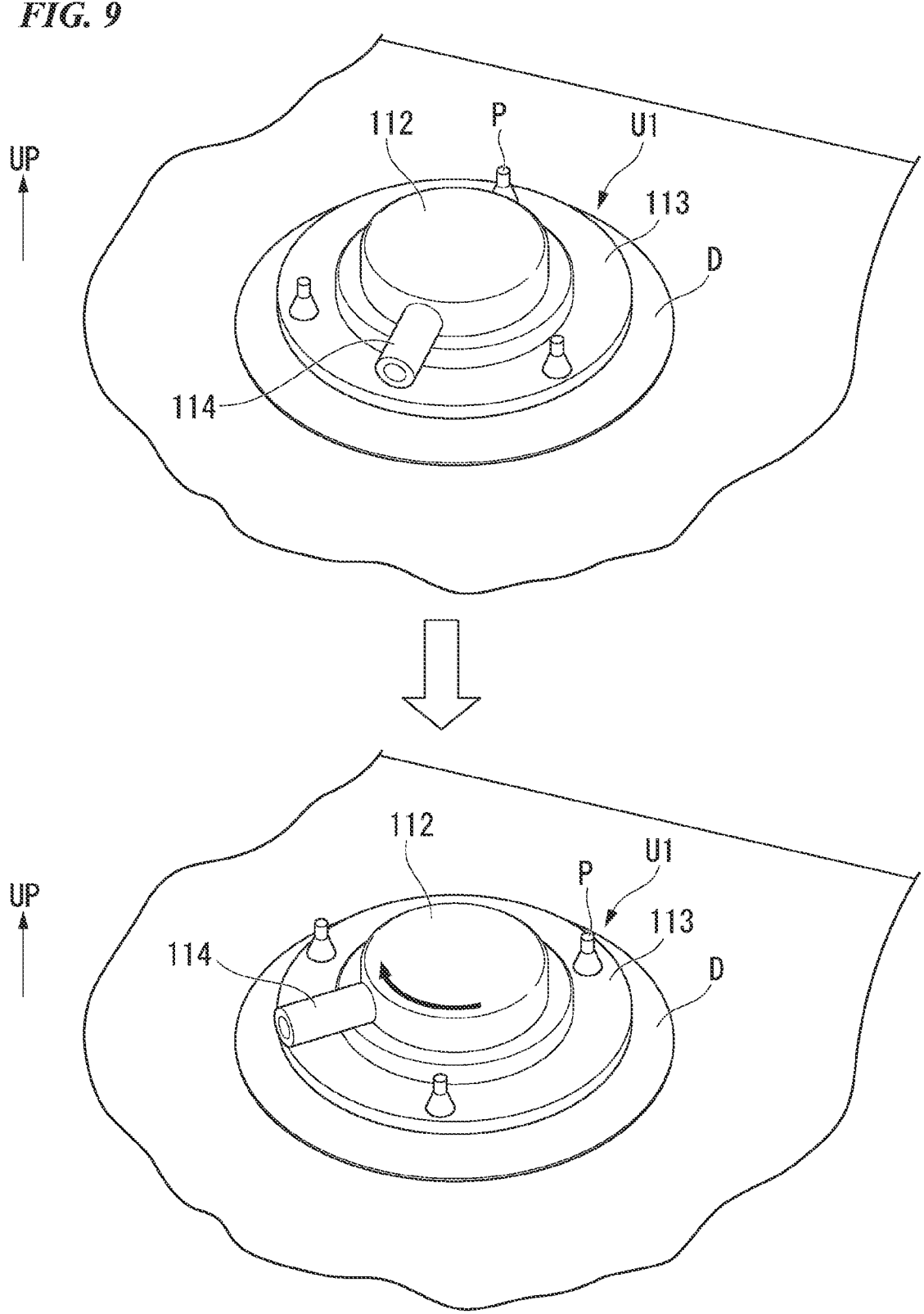
FIG. 9 is a perspective view showing a method of attaching the fuel cut-off unit.

Next, the fitting portion U2 is inserted into the penetration hole C. At this time, as shown in FIGS. 8 and 9, the plurality of claw portions 105 are slipped into the plurality of cutout portions F1 formed in the inner wall portion C1 provided in the circumferential edge portion C2 of the penetration hole C. If the fuel cut-off unit U is further moved downward, the lower end portion 103D1 of the first skirt 103D abuts the edge R of the circular opening, and the fuel cut-off unit U is subjected to concentric positioning with the penetration hole C.

At this time, a lower end portion 103E1 of the second skirt 103E is fitted into the O-ring W, and the O-ring W is sandwiched between the second skirt 103E and the vertical wall Q1 of the step portion Q. At this time, the O-ring W is elastically deformed and closely adheres to the second skirt 103E and the vertical wall Q1 due to residual stress of deformation.

A worker holds the unit exterior portion U1 exposed to the outer side of the fuel tank 31 and rotates the unit exterior portion U1 clockwise. At this time, the accommodation container 100 rotates clockwise. In the claw portion 105 passing through the cutout portion F1, a corner portion 105A on the front side in a forward movement direction of an upper surface 105B abuts a corner portion F2A on the cutout portion F1 side adjacent to the first stopper F2. At this time, the worker holds the unit exterior portion U1 and further rotates the unit exterior portion U1 clockwise while feeling resistance from the unit exterior portion U1.

Consequently, the corner portion 105A of the claw portion 105 moves forward in the forward movement direction while being guided by the corner portion F2A of the first stopper F2 and moving downward, and the upper surface 105B of the claw portion 105 moves to a lower surface F2B of the first stopper F2. At this time, in the unit exterior portion U1, the fixing pedestal 103 moves downward (refer to FIG. 3). Further, the dust seal D is compressed and elastically deformed in the vertical direction by the fixing pedestal 103 and the upper surface of the fuel tank 31.

If the worker holds the unit exterior portion U1 and further rotates the unit exterior portion U1 clockwise, the upper surface 105B of the claw portion 105 slides in the forward movement direction while abutting the lower surface F2B of the first stopper F2, and a corner portion 105C on the rear side reaches a corner portion F2C facing the corner portion F2A of the first stopper F2 in the forward movement direction of the upper surface 105B of the claw portion 105 (refer to FIG. 8).

If the worker holds the unit exterior portion U1 and further rotates the unit exterior portion U1 clockwise, the corner portion 105C of the claw portion 105 abuts the corner portion F2C of the first stopper F2. At this time, in the claw portion 105, a force in an upward direction is applied to the first stopper F2 due to residual stress of elastic deformation of the dust seal D. For this reason, the corner portion 105C of the claw portion 105 is guided by the corner portion F2C of the first stopper F2, and the claw portion 105 moves in the forward movement direction while moving upward and is fitted to the locking surface F3 adjacent to the first stopper F2.

If the worker holds the unit exterior portion U1 and further rotates the unit exterior portion U1 clockwise, the claw portion 105 abuts the second stopper F4, forward movement thereof is inhibited, and rotation of the fuel cut-off unit U stops in a state in which the claw portion 105 is fitted to the locking surface F3. Since the downward protruding amount of the second stopper F4 exceeds the upper limit for the amount of elastic deformation in the downward direction of the dust seal D, even if the worker further applies a force in the rotation direction to the fuel cut-off unit U, the claw portion 105 does not rotate by being guided by the second stopper F4. Since the fuel cut-off unit U is disposed at the center in the vehicle width direction and within the width of a main frame in a plan view, it can be compactly disposed in the width direction. In addition, since the fuel cut-off unit U is disposed on the inner side from a region X connecting the handlebar 7 and a step 40 (refer to FIG. 2), it is constituted such that a riding posture of a rider is not hindered.

In this state, since residual stress of elastic deformation is present in the dust seal D, the claw portion 105 is pressurized upward with respect to the locking surface F3. Accordingly, the dust seal D closely adheres to the lower surface 103A of the fixing pedestal 103 and the upper surface of the fuel tank 31 and prevents invasion of dust into the fuel tank 31. Through the foregoing step, the fuel cut-off unit U is reliably fixed while being accurately subjected to positioning at a predetermined position with respect to the fuel tank 31.

As described above, according to the attachment structure of the fuel cut-off unit U, attachment can be simply performed while the number of components used during attachment is reduced. In addition, according to the attachment structure of the fuel cut-off unit U, while a simple attaching step is realized, positioning of the fuel cut-off unit U can be reliably performed, and shielding properties with respect to dust and sealing properties of the fuel tank 31 can be ensured.

Hereinabove, a form for carrying out the present invention has been described using an embodiment, but the present invention is not limited to the embodiment in any way, and various modifications and replacements can be applied within a range not departing from the gist of the present invention. For example, the foregoing embodiment has been described with an example applied to a motorcycle for off-road traveling, but the purpose of a vehicle is not limited in any way.

In addition, the foregoing saddle-type vehicle includes all types of vehicles in which a rider rides the vehicle in a manner of straddling a vehicle body and includes not only motorcycles (including motorized bicycles and scooter-type vehicles) but also vehicles having three wheels (including vehicles having two front wheels and one rear wheel in addition to vehicles having one front wheel and two rear wheels) or four wheels.

In addition, in the foregoing embodiment, an example in which protruding first locking portions are formed to be engaged with second locking portions has been described, but the embodiment is not limited thereto. A second locking portion may be formed to be recessed on the main body portion 101 side, and the first locking portion may be formed to protrude from the fuel tank 31 toward the main body portion 101. In addition, a penetration hole may not only be recessed in the inward direction of a fuel tank but may also be formed to protrude in the outward direction.

REFERENCE SIGNS LIST

1 Motorcycle (saddle-type vehicle)
31 Fuel tank
100 Accommodation container
103 Fixing pedestal
103E Second skirt (circumferential wall portion)
105 Claw portion (first locking portion)
114 Pipe attachment portion (breather passage)
C Penetration hole
C1 Inner wall portion
C2 Circumferential edge portion
D Dust seal (first elastic member)
F Locking portion (second locking portion)
F1 Cutout portion
Q Step portion
Q1 Vertical wall
Q2 Horizontal wall
U Fuel cut-off unit
U1 Unit exterior portion
U2 Fitting portion
W O-ring (second elastic member)

What is claim is:

1. A fuel cut-off unit attachment structure that is an attachment structure of a fuel cut-off unit that is provided in a fuel tank of a saddle-type vehicle includes a breather passage for discharging volatile fuel to the outside and a valve device for cutting off outflow of liquid fuel,
   wherein the fuel cut-off unit includes an accommodation container constituted of a fitting portion which is inserted into the fuel tank at the time of attachment to the fuel tank and a unit exterior portion which is positioned outside the fuel tank,
   wherein a plurality of first locking portions for performing positioning at the time of attachment to the fuel tank are formed in the fitting portion,
   wherein a penetration hole penetrating from the inside to the outside such that the fitting portion is inserted therethrough is formed in the fuel tank,
   wherein second locking portions for fixing the fuel cut-off unit by causing the first locking portions to be engaged from an inner side of the fuel tank are provided in a circumferential edge portion of the penetration hole,
   wherein the plurality of first locking portions are formed at unequal intervals in a circumferential direction of the fitting portion,
   wherein the accommodation container includes a fixing pedestal which is formed to have a larger diameter than the penetration hole,
   wherein a first elastic member is provided between the fixing pedestal and the fuel tank,
   wherein the circumferential edge portion is provided with a tubular inner wall portion which is formed to protrude in an inward direction of the fuel tank,
   wherein a circumferential wall portion is formed in the circumferential direction on an outer circumferential surface of the accommodation container, and a second elastic member is provided between the circumferential wall portion and the inner wall portion,
   wherein the first elastic member is a toric dust seal which is formed to have a larger diameter than the fixing pedestal,
   wherein a cutout portion is formed in the second locking portion, and
   wherein the cutout portion is cut out to have a larger diameter than the first locking portions in a radial direction of the penetration hole.

2. The fuel cut-off unit attachment structure according to claim 1,
   wherein one or more pins for performing positioning are formed in the first elastic member at a position corresponding to one or more penetration holes of the fixing pedestal, and the pins are formed in the circumferential direction of the fixing pedestal in a manner of protruding upward from an upper surface of the first elastic member,
   wherein the pins are formed such that pillars having substantially the same diameters as the penetration holes protrude upward, and
   wherein distal end portions of the pins are formed to have tapered shapes in which a bottom portion has a diameter a larger than the diameters of the pillars and the diameter is reduced toward a distal end.

3. The fuel cut-off unit attachment structure according to claim 2,
   wherein the second locking portions are formed in the inner wall portion,
   wherein the first locking portions are formed to protrude from a surface of the accommodation container,
   wherein the inner wall portion is formed to have a diameter smaller than outer diameters of the first locking portions in a plan view,
   wherein the second locking portions are formed such that the first locking portions are locked therein in the inner wall portion, and
   wherein when the first locking portions and the second locking portions are locked, the first elastic member is pressurized and elastically deformed by the fixing pedestal and the fuel tank, closely adheres to a lower surface of the fixing pedestal and an upper surface of the fuel tank, and prevents invasion of dust into the fuel tank.

4. The fuel cut-off unit attachment structure according to claim 1,
   wherein a stepped step portion is formed in the circumferential edge portion of the penetration hole,
   wherein a tubular vertical wall which protrudes downward from an upper surface side of an outer wall of the fuel tank and a toric horizontal wall which protrudes toward an inner side of the penetration hole in a horizontal direction from a lower end of the vertical wall are formed in the step portion, and
   wherein the second elastic member is disposed between the vertical wall and the horizontal wall.

5. The fuel cut-off unit attachment structure according to claim 1,
   wherein three or more of the first locking portions are formed in the circumferential direction.

6. The fuel cut-off unit attachment structure according to claim 1,
   wherein the fuel cut-off unit is disposed at an apex portion of the fuel tank.

7. The fuel cut-off unit attachment structure according to claim 1,
   wherein a plurality of ribs are provided in a connection part between a lower surface side of the fixing pedestal and a main body portion of the accommodation container in a manner of radially protruding from the main body portion and protruding downward from the lower surface of the fixing pedestal.

8. The fuel cut-off unit attachment structure according to claim 7,
   wherein a cylindrical skirt which is formed to have a larger diameter than the main body portion and to protrude downward beyond the lower surface of the fixing pedestal is provided on the lower surface side of the fixing pedestal, and the plurality of ribs are formed such that the main body portion and the skirt are mounted.

* * * * *